(12) United States Patent
Wang et al.

(10) Patent No.: US 10,834,368 B2
(45) Date of Patent: Nov. 10, 2020

(54) KIND OF PARTIALLY RELIABLE TRANSMISSION METHOD BASED ON HIDDEN MARKOV MODEL

(71) Applicant: SICHUAN UNIVERSITY, Chengdu, Sichuan (CN)

(72) Inventors: Junfeng Wang, Chengdu (CN); Qin Luo, Chengdu (CN); Ying Liu, Chengdu (CN); Hao Niu, Chengdu (CN); Xiaohui Li, Chengdu (CN)

(73) Assignee: SICHUAN UNIVERSITY, Chengdu (CN)

( * ) Notice: Subject to any disclaimer, the term of this patent is extended or adjusted under 35 U.S.C. 154(b) by 35 days.

(21) Appl. No.: 16/219,844

(22) Filed: Dec. 13, 2018

(65) Prior Publication Data
US 2019/0191130 A1    Jun. 20, 2019

(30) Foreign Application Priority Data
Dec. 14, 2017   (CN) .......................... 2017 1 1337016

(51) Int. Cl.
*H04N 7/20*         (2006.01)
*H04B 17/391*       (2015.01)
*H04N 21/647*       (2011.01)
*H04N 21/643*       (2011.01)
*H04L 25/03*        (2006.01)
(Continued)

(52) U.S. Cl.
CPC ........... *H04N 7/20* (2013.01); *H04B 17/3913* (2015.01); *H04L 25/03171* (2013.01); *H04N 21/238* (2013.01); *H04N 21/2381* (2013.01); *H04N 21/23439* (2013.01); *H04N 21/23805* (2013.01); *H04N 21/2402* (2013.01); *H04N 21/6375* (2013.01); *H04N 21/64322* (2013.01); *H04N 21/64738* (2013.01); *H04N 21/64792* (2013.01); *H04N 21/6143* (2013.01)

(58) Field of Classification Search
None
See application file for complete search history.

(56) References Cited

U.S. PATENT DOCUMENTS

| | | | |
|---|---|---|---|
| 8,948,026 B2 * | 2/2015 | Rhee ...................... | H04M 3/247 370/252 |
| 2006/0280235 A1 * | 12/2006 | Rhee ................... | H04L 41/5054 375/222 |
| 2015/0200684 A1 * | 7/2015 | Kanievskyi ........... | H03M 13/03 714/703 |

* cited by examiner

*Primary Examiner* — Jeffrey M Rutkowski
*Assistant Examiner* — Mehedi S Aley
(74) *Attorney, Agent, or Firm* — Oliff PLC

(57) ABSTRACT

This invention discloses a kind of reliable data transmission method based on hidden Markov model that specific to video transmission quality enhancement over lossy satellite links. It uses HMM model to forecast retransmission rate and adopts the network packet loss rate to reflect the network performance. The underlying network packet loss rate is used as the hidden state of HMM model and the retransmission rate is used as the observation state. By analyzing the historically transmitted data sessions, APRT establishes the relationship between the hidden state transition probability and the emission probability. Then, a robust and efficient retransmission rate prediction is obtained. This invention takes into full consideration of high BER in satellite network channels and adjusts the reliable level according to the satellite network channel characteristics so as to make tradeoff between instantaneity and quality. Consequently, it guarantee the QoS and QoE of video stream.

3 Claims, 8 Drawing Sheets

(51) Int. Cl.
*H04N 21/24* (2011.01)
*H04N 21/6375* (2011.01)
*H04N 21/238* (2011.01)
*H04N 21/2343* (2011.01)
*H04N 21/2381* (2011.01)
H04N 21/61 (2011.01)

(a)Original (b)APRT (c)P2 (d)P4

(a)Original (b)APRT (c)P2 (d)P4

(a)Original (b)APRT (c)P2 (d)P4

(a)Original (b)APRT (c)P2 (d)P4

(a) Original (b)APRT (c)P4

(a) Original (b)APRT (c)P4

(a) Original (b)APRT (c)P4

(a)Original (b)APRT (c)P2 (d)P4

(a)Original (b)APRT (c)P4

(a)Original (b)APRT (c)P4

KIND OF PARTIALLY RELIABLE TRANSMISSION METHOD BASED ON HIDDEN MARKOV MODEL

FIELD OF TECHNOLOGY

This invention involves the end-to-end partially reliable transmission field, which involves a kind of transmission method based on hidden Markov model that specific to video transmission quality enhancement over lossy satellite links.

BACKGROUND TECHNOLOGY

Multimedia applications play an important role in satellite networks and High-Definition (HD) video dominated streaming applications increasingly, providing these applications with good QoS and QoE continues to be a critical problem. For the delay-sensitive type of applications, the conventional transmission policy cannot be adopted with the limited bandwidth and high bit error rate (BER) of satellite channel. Therefore, how to design efficient transfer protocol with guaranteed QoS and QoE for video transfer in satellite network is one of the key issues.

Reliable transmission control protocol (e.g., TCP and its variants) and unreliable user datagram protocol (e.g., UDP) are widely used for video transmission at the transport layer. TCP is widely used as the primary data transmission protocol, which can enable firewall penetration throughout the network and keep friendliness between different flows. In many papers, video is transferred with TCP protocol at the transport layer. For example, the existing work proposed the CS2P protocol by analyzing the throughput characteristics of different session data. CS2P can predict the initial throughput, and then use the hidden Markov model (HMM) to establish the medium flow forecasting model. Finally, using throughput rate control, CS2P can achieve adaptable for video transmission control. PATON improves the quality of real-time video streams by using the technologies, i.e., forward error correction (FEC), video frame priority selection, and adaptive redundancy. However, because satellite network has a high bit error rate environment, video applications directly use TCP protocol as the underlying protocol for data transmission may cause many problems. First, the reliable transport mechanism of TCP protocol will cause multiple retransmits until the lost packets are correctly received. For delay-sensitive applications, the retransmitted packets are likely to be invalid for video playout before they are received. Furthermore, when packet loss events occur, the congestion control and congestion avoidance mechanism of TCP protocol can result in low bandwidth occupation of video streams and cannot obtain higher bandwidth occupation when competing with UDP flow. In summary, reliable transmission strategies cannot guarantee QoS of video flows over satellite networks.

Nowadays, most multimedia applications are based on unreliable transmission protocols, such as UDP protocol and RTP protocol. Many well-known applications are based on UDP protocol (i.e., Skype and WebRTC). For example, GCC performs rate control based on RTP/RTCP protocol, and then uses the Kalman filter algorithm to estimate the delay gradient of packets in the networks, which can indicate the network congestion level. GCC is used for Google Hangouts and Chrome WebRTC protocol stack in reality. An existing work proposed the DCCP protocol which uses the principle of incremental sequence number. Moreover, by assessing whether the packet exceeds its scheduled life cycle, DCCP determines whether to retransmit the lost packet. However, transmission method of unreliable transmission protocol also has some disadvantages. First, UDP and RTP protocol without congestion control mechanism flood data packets into network, which may deteriorate the overall network performance. In addition, unreliable transmission protocol does not guarantee data transmission reliability. When the satellite network is in good condition but has large amount of stochastic packet losses, unreliable transfer methods will greatly influence the QoS of HD video.

CONTENTS OF THE INVENTION

This invention aims to solve the technical problem which offers a kind of reliable transmission method based on hidden Markov model (hereafter referred to as APRT protocol) to handle the quality and real-time problem of delay-sensitive video service over lossy satellite links.

To solve the technical problem mentioned above, the technical program adopted by this invention is:

Step 1: Present the specification definition of HMM model.

This method uses HMM model to forecast retransmission rate. The underlying network packet loss rate is used as the hidden state of HMM model and the retransmission rate is used as the observation state. By analyzing the historically transmitted data sessions, it establishes the relationship between the hidden state transition probability and the emission probability. Then, a robust and efficient retransmission rate prediction is obtained.

Random variables $W_t$ is defined as the retransmission rate of APRT protocol in time period t. $w_t$ is defined as the actual retransmission rate measured in the network. $\hat{W}_t$ indicates the predicted value of random variable $W_t$. Assume that the retransmission rate of the strategy $W_t$ is changing with the variation of some hidden state variables $X_t \in \chi$, where $\chi \in \{x_1, x_2, \ldots, x_N\}$ represents a set of possible discrete state sequences and $N = |\chi|$ indicates the number of states. State variables $X_t$ is a random variable and the probability distribution is defined as the vector $\pi = (P(X_t = x_1), \ldots, P(X_t = x_N))$.

The HMM model assumes that the state varies with the Markov process, where the probability distribution of the current state is determined by the state of its previous period, that is $P(X_t | X_{t-1}, \ldots, X_1) = P(X_t | X_{t-1})$. The defined transition probability matrix is $P = \{P_{ij}\}$, where $P_{ij} = P(X_t = x_i | X_{t-1} = x_j)$. According to Markov properties, it can be concluded that $\pi_{t+\tau} = \pi_t P^\tau$. When a hidden state $X_t$ is given, we assume that the probability distribution function (pdf) of network packet loss rate follows the following Gaussian distribution function: $W_t | X_t = x \sim N(\mu_x, \sigma_x^2)$.

Step 2: Offline training phase.

When the number of states N is given, and the training data set is Set($M_s^*$, s), utilize the maximum likelihood estimation algorithm to calculate the parameters of HMM model, which can be expressed by the equation $\theta_{HMM} = \{\pi_0, P, \{(\mu_x, \sigma_x^2), x \in \chi\}\}$.

Step 3: Online prediction stage.
1) Prediction initialization: Set($M_s^*$, s) is the most matching feature for the transmission of flow s, which is defined as $\hat{W}_1 = \text{Median}(\text{Set}(M_s^*, s))$, where Set($M_s^*$, s) is the mean value of the data set and as the initial network packet loss rate.
2) Forecast phase. In the period t, the updated pdf of the HMM model is given. Then, according to Markov feature, the pdf of current time period can be calculated by the equation $\pi_{t|1:t-1} = \pi_{t-1|1:t-1} P$. The predicted retransmission rate $\hat{W}_t$ can also be calculated.

3) Parameter update of HMM model. When the actual network packet loss rate $W_t = w_t$ and $\pi_{t|1:t-1}$ are given, Baum-Welch algorithm is used to update the parameters of HMM model. $\pi_{t|1:t-1}$ is updated as $\overline{\pi}_{t|1:t-1}$, and $P_{ij}$ is updated as $\overline{P}_{ij}$.

Step 4: Congestion Control.
1) Rate control for video flow. When the receiver uses the HMM model to determine the retransmission rate of the video, it returns the adaptive ACK feedback packet. When the sender receives the ACK packets, the APRT protocol congestion window control adopts the loss based congestion indicators, and the cubic window growth function, which is defined in Cubic TCP, so as to update the congestion window increase quickly and discreetly.
2) Fast retransmission. When the network is in a non-congested state, the receiver side returns almost all the ACK feedbacks of all received data, and the sender performs fast retransmission after receiving duplicated ACKs or timeout as traditional transport protocol. When the network is predicted in a poor or a congested state, the receiver retransmits the acknowledgment feedback partially, and the sender only performs fast retransmission for the confirmed lost packets. For extreme conditions, such as if the network is in idle time, the APRT protocol is regarded as a completely reliable transmission protocol as the TCP protocol.

According to the program mentioned above, in Step 3, the formula to calculate in Step 3 is defined as follows:

$$\hat{W}_t = \mu_x$$

$$x = \arg\max_{x \in \chi} P\left(\sum_{j}^{n} X_N(j)\right)$$

$$X_{t+1}(j) = \sum_{i=1,\ldots,N} X_t(i) P_{ij} \cdot W_{t+1} \mid X_j$$

According to the program mentioned above, in Step 3, the formula to calculate $\pi_{t|1:t-1}$ and $\overline{P}_{ij}$ in Step 3 is defined as follows:

$$\overline{\pi}_{t|1:t-1} = \frac{P(W_1, W_2, \ldots, W_t, X_t = x_i \mid W_{1:t}) \cdot P(W_{t+1} \mid X_t = x_i, W_{1:t})}{\sum_{i=1}^{N} P(W_1, W_2, \ldots, W_t, X_t = x_i \mid W_{1:t}) \cdot P(W_{t+1} \mid X_t = x_i, W_{1:t})}$$

$$\overline{P}_{ij} = \frac{P(W_1, W_2, \ldots, W_t, X_t = x_i \mid W_{1:t}) P_{ij} \cdot W_{t+1} \mid X_j \cdot P(W_{t+1}, W_{t+2} \mid X_{t+1} = x_{i+1}, W_{1:t+1})}{\sum_{i=1}^{N} P(W_1, W_2, \ldots, W_t, X_t = x_i \mid W_{1:t}) \cdot P(W_{t+1} \mid X_t = x_i, W_{1:t})}$$

Being compared with the current technology, the beneficial effects of this invention are: 1) It employ HMM model to depict reliable level of the transfer strategy, which can make tradeoffs between the quality of the video application and the real-time performance of video transfer. Through offline training initialization and online prediction, the relationship between the packet loss and the reliability of the transmission is established, which can represent good video quality and minimum packet delay. 2) It can retransmit the lost packets as the network changing without losing of key frames. It is compatible with the existing TCP congestion control scheme for rate control, and takes the video frame priority into consideration for partial reliability transmission. Comparing with other video transfer strategies, APRT achieves higher throughput while ensuring lower packet delay. Consequently, the proposed protocol can guarantee the video stream QoS for satellite network.

SPECIFICATION OF THE ATTACHED FIGURES

FIG. 1 shows the overview of HMM model.
FIG. 2 shows the simulation topology.
FIG. 3 shows the average throughput of each protocol under different link error rates when the bottleneck link bandwidth is 10 Mbps.
FIG. 4 shows the average throughput of each protocol under different link error rates when the bottleneck link bandwidth is 200 Kbps.
FIG. 5 shows the changing of RTT of different single flow over time when the link error rate is $10^{-5}$ in scenario A.
FIG. 6 shows the changing of RTT of different single flow over time when the link error rate is $10^{-5}$ in scenario B.
FIG. 7 shows the changing of delay jitter of different single flows over time in scenario A and scenario B.
FIG. 8 shows the changing of delay jitter of different single flows over time in scenario B.
FIG. 9 shows the subjective video quality of different single protocols using different video test sequence, when the bandwidth is 10 Mb/s and BER is $10^{-7}$ (1).
FIG. 10 shows the subjective video quality of different single protocols using different video test sequence, when the bandwidth is 10 Mb/s and BER is $10^{-7}$ (2).
FIG. 11 shows the subjective video quality of different single protocols using different video test sequence, when the bandwidth is 10 Mb/s and BER is $10^{-7}$ (3).
FIG. 12 shows the subjective video quality of different single protocols using different video test sequence, when the bandwidth is 10 Mb/s and BER is $10^{-7}$ (4).
FIG. 13 shows the subjective video quality of different single protocols using different video test sequence, when the bandwidth is 200 Kb/s and BER is $10^{-6}$ (1).
FIG. 14 shows the subjective video quality of different single protocols using different video test sequence, when the bandwidth is 200 Kb/s and BER is $10^{-6}$ (2).
FIG. 15 shows the subjective video quality of different single protocols using different video test sequence, when the bandwidth is 200 Kb/s and BER is $10^{-6}$ (3).
FIG. 16 shows the impact of different playout buffer sizes on the quality of APRT protocol.
FIG. 17 shows the average throughput of three video flows under different link BERs when the bottleneck link bandwidth is 10 Mbps.
FIG. 18 shows the average throughput of three video flows under different link BERs when the bottleneck link bandwidth is 200 Kbps.
FIG. 19 shows the changing of RTT of different concurrent flows over time in scenario A.
FIG. 20 shows the changing of RTT of different concurrent flows over time in scenario B.
FIG. 21 shows the changing of delay jitter of different concurrent flows over time in scenario A.
FIG. 22 shows the changing of delay jitter of different concurrent flows over time in scenario B.
FIG. 23 shows subjective video quality of different concurrent protocols using different video test sequence, when the bandwidth is 10 Mb/s and BER is $10^{-7}$ (1).

SPECIFIC IMPLEMENTATION METHOD

Further specific specification is given as follows by combining the attached figures and the implementation case in detail.

Figure 1:
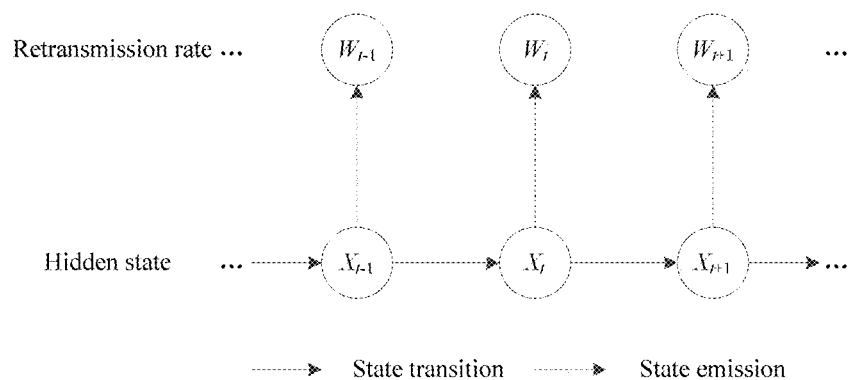
Figure 2:
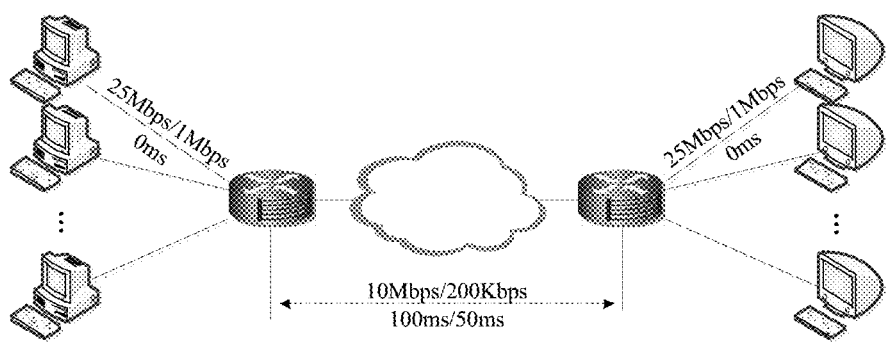

Simulation topology is shown in FIG. 2, which includes the senders, the receivers and the satellite networks. The following two main scenarios are simulated:

Scenario A: bandwidth of the bottleneck link is 10 Mb/s with varied round trip time (RTT), which represents broadband MEO satellite networks;

Scenario B: bandwidth of the bottleneck link is 200 Kb/s with varied RTT, which represents narrowband LEO satellite networks.

The APRT protocol is compared with different types of protocols, which include various reliability and order. Therein, variable $\xi$, denote the reliability degree of the transport service provided. A reliable service is 100% reliable. A partially reliable service is the service with $\xi \in [0\%, 100\%]$, variable $\Omega$ defines the orderliness of the strategy, where $\Omega \in [0\%, 100\%]$. P1 represents APRT protocol, P2 represents the protocol with $\xi=1$, $\Omega=1$, P3 represents the protocol with $\xi \leq 1$, $\Omega=1$, P4 represents the protocol with $\xi \leq 1$, $\Omega=1$∘

Figure 3:
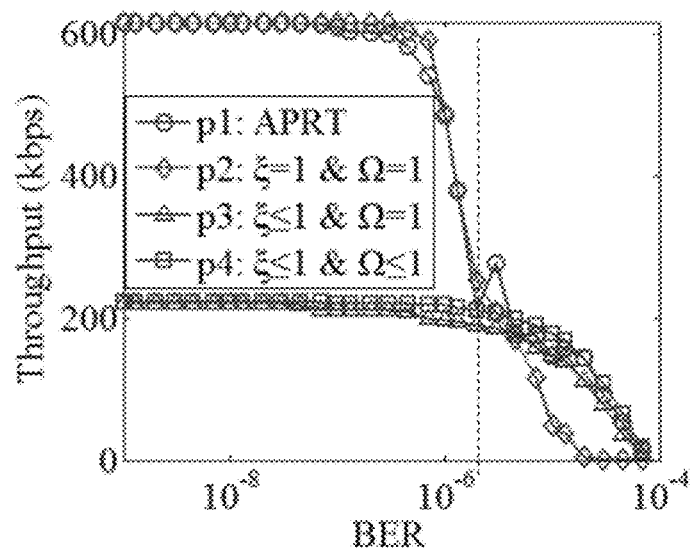
Figure 4:
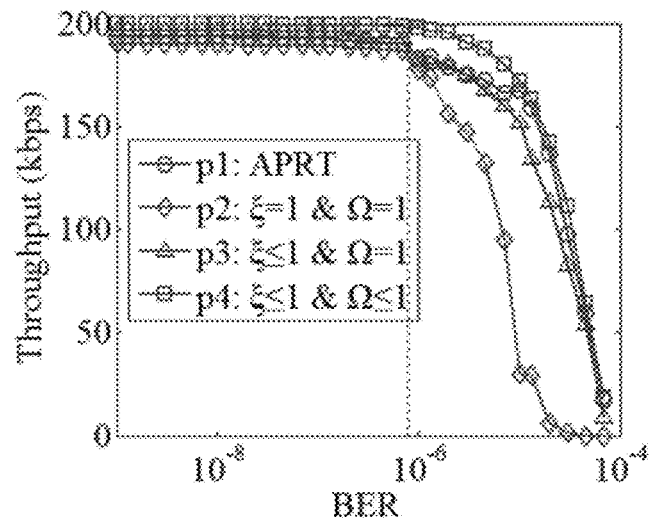

It can be concluded from both FIGS. 3 and 4 that the average throughput of all protocols reduces with the increase of link error rate. As shown in FIG. 3, when the bottleneck link bandwidth is 10 Mbps, all protocols cannot take full advantage of the link bandwidth, so that the network is in a state of no congestion. When the BER is from $10^{-9}$ to $10^{-6}$, the network is in good state. The average throughput of APRT and p2 strategies are higher than p3 and p4 strategies. This is because the throughput of unreliable strategies (i.e., p3 and p4) is limited by the transfer speed of video encoded frames from the application layer to the transport layer at the sender side. Nevertheless, there is a reliable confirmation component in p2 strategy and APRT protocol, which produces part of the retransmission packets. When the link error rate is greater than $2.0 \times 10^{-6}$, the average throughput of p3 and p4 strategies start to larger than that of reliable p2 strategy, while the APRT protocol begins to perform a similar performance to p4 strategy. The reason for this is that p2 strategy is based on the ACK acknowledgment to assure reliability while APRT adopts partially reliable transfer mechanism.

As shown in FIG. 4, when the bottleneck link bandwidth is 200 Kbps, the bottleneck link has been saturated, and is in a moderate congestion state. For different BER, p4 strategy always maintains the highest average throughput of about 200 Kbps, followed by p3 strategy. When the link error rate is from $10^{-9}$ to $10^{-6}$, average throughput of APRT protocol is slightly higher than of p2 strategy. When the BER is larger than $10^{-6}$, p2 strategy has an obvious performance degradation, the reason is that p3 and p4 strategies have no packet transmission control mechanism, so that the throughput is large. Therein, p3 strategy applies a packet in-order guarantee mechanism, so that the throughput of p3 is slightly smaller than that of p4 strategy, in which $\Omega=1$. For APRT protocol, it will determine the state of the network according to the HMM model. When approaching the saturation bandwidth occupancy, APRT utilizes partially reliable transmission mechanism. When the network packet loss rate is large, APRT reduces the reliability of the protocol for real-time transmission. Thus, the proposed protocol can make tradeoffs between high-quality and playback continuity.

Figure 5:
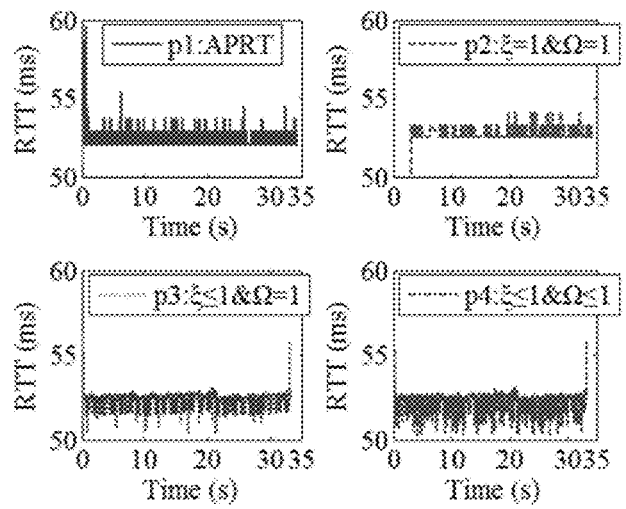
Figure 7:
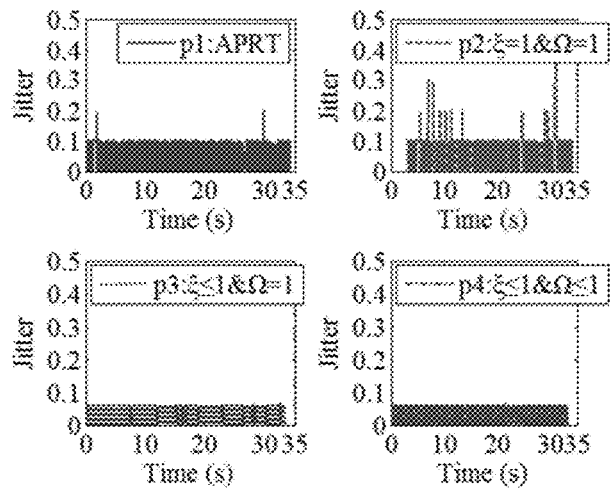

It can be seen from FIG. 5 that the RTT of APRT protocol changes between [52.5 ms, 53 ms], the RTT of p2 strategy varies between [52.5 ms, 53.5 ms], and that of p3 and p4 strategies changes between [50 ms, 53 ms]. This is because that when the network bandwidth is not fully utilized, the reliable mechanism of p2 strategy will cause network routers cache a certain amount of data packets, so that the packet has a queuing delay. This will result in RTT increase. While for protocols without guaranteeing reliability, the more the protocol is unreliable, the lower the RTT is. Combining the jitter result shown in FIG. 7, p2 strategy has a high delay jitter. The larger the delay jitter is, the less stable queueing produced in the bottleneck routers.

Figure 6:
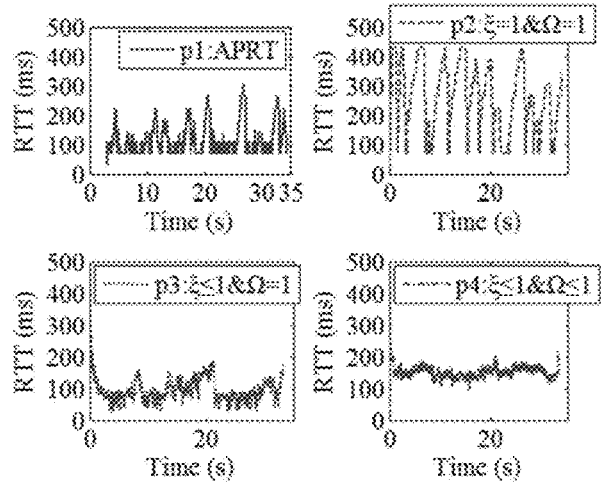
Figure 8:
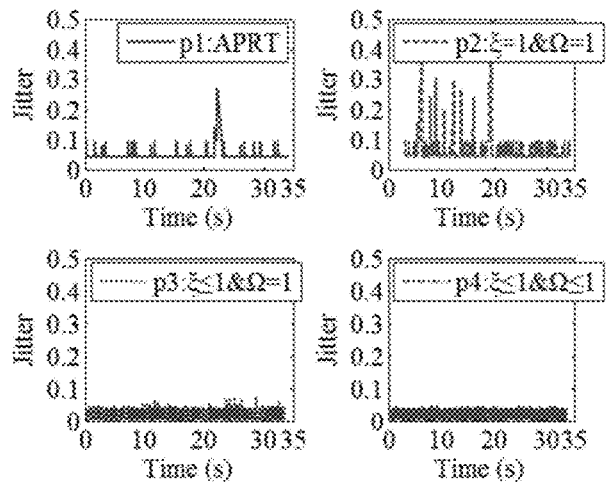
Figure 9:
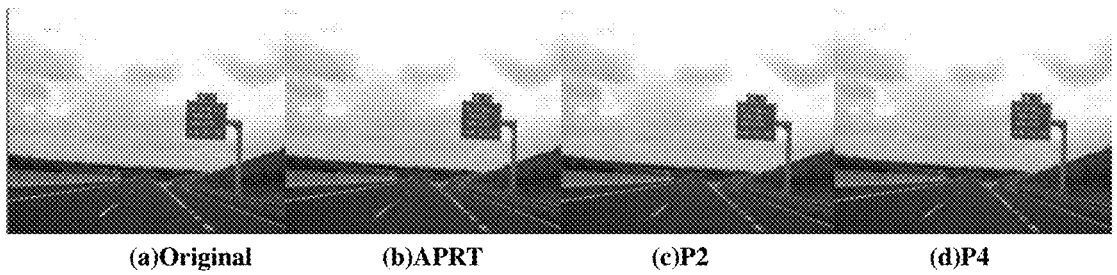
Figure 10:
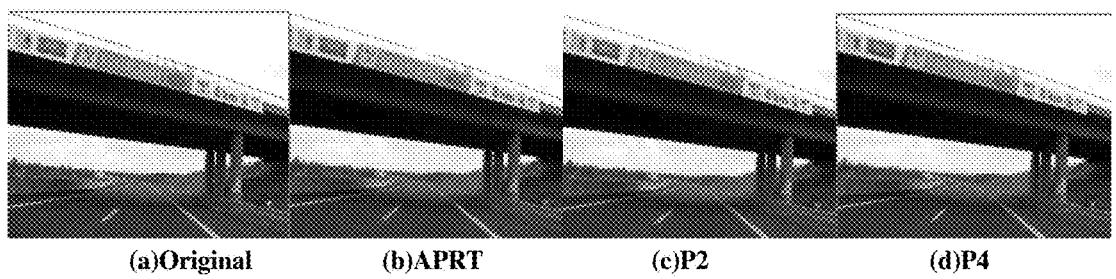
Figure 11:
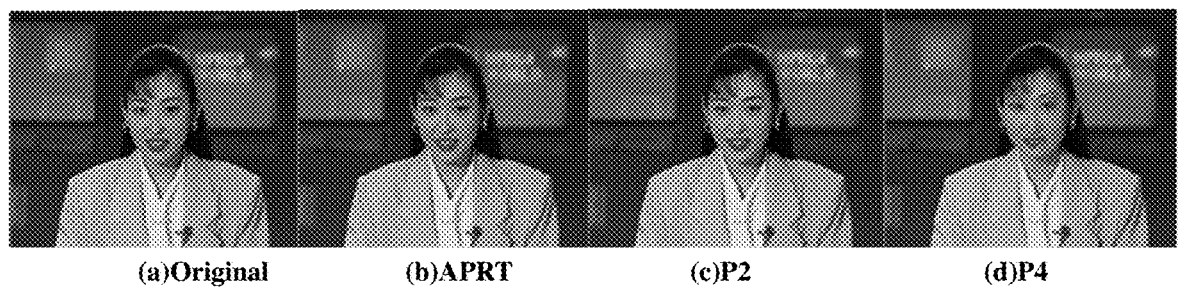
Figure 12:

It can be seen from FIG. 6 that RTT of different protocols has big difference. Therein, the RTT of p2 is much higher than the other three protocols. This is caused by the congestion control of p2 strategy; whose window changes regularly. At this time, the network utilization is high with high random BER in satellite networks, which results in a large number of packets buffered in routers. When the network has free bandwidth, the growth of the window is slow. Once packet loss events occur, congestion window of p2 turns into the congestion avoidance stage. The RTT of p4 packet is less than that of p2 strategy packet. Because of the high utilization of the network at this time, and that p4 strategy does not have congestion control mechanism, the routers of bottleneck link also buffer a large number of data packets. Because of p3 strategy guarantees the packet order and will discard the out-of-order packet at the receiver side, most RTT of p3 packets are less than 150 ms delay. APRT protocol also has a smaller round-trip delay APRT also represents a ladder curve characteristics, which is doe to the HMM model network prediction. APRT carries out an adaptive reliability and avoids unnecessary congestion window reduction so as to maintain the congestion window in a relatively stable state. According to the corresponding delay jitter in FIG. 8, it can be seen that the delay jitter range of p2 strategy is between [0,0.5], which is violent, and the APRT protocol is around 0.1, except that some individual points reach 0.3. p4 and p3 strategies achieve minimal delay jitter, which are all less than 0.06.

Table 1 examines the packet loss results in different network states. Overall, it can be seen that for different BERs, packet loss rate of different protocols is: packet loss rate of p4>packet loss rate of p3>packet loss rate of APRT>packet loss rate of p2. When the bandwidth of 200 Kbps, the performance of p4 strategy and p3 strategy are affected greatly, and the total number of dropped frames are 452 and 314, respectively. The total number of dropped frames of APRT protocol is 178 at most.

TABLE 1

Lost Frames of Different Protocols under Single Flow Scenarios with Different Bandwidths and BERs.

| Bandwidth protocol | BER | Packet loss rate | Lost frame |
|---|---|---|---|
| | | 10 Mb/s | |
| P1 | $10^{-7}$ | 0.0065 | 17 |
| | $10^{-5}$ | 0.1215 | 52 |
| P2 | $10^{-7}$ | 0.0062 | 16 |
| | $10^{-5}$ | 0.1375 | 40 |
| P3 | $10^{-7}$ | 0.068 | 18 |
| | $10^{-5}$ | 0.1198 | 286 |

TABLE 1-continued

Lost Frames of Different Protocols under Single Flow
Scenarios with Different Bandwidths and BERs.

| Bandwidth protocol | BER | Packet loss rate | Lost frame |
|---|---|---|---|
| P4 | $10^{-7}$ | 0.0074 | 19 |
|  | $10^{-5}$ | 0.1166 | 299 |
| 200 Kb/s | | | |
| P1 | $10^{-7}$ | 0.0471 | 83 |
|  | $10^{-5}$ | 0.1409 | 178 |
| P2 | $10^{-7}$ | 0.0285 | 24 |
|  | $10^{-5}$ | 0.1341 | 24 |
| P3 | $10^{-7}$ | 0.1638 | 303 |
|  | $10^{-5}$ | 0.1364 | 314 |
| P4 | $10^{-7}$ | 0.1762 | 452 |
|  | $10^{-5}$ | 0.1567 | 402 |

The PSNR results are shown in Table 2. The upper part of Table 2 shows a good state of the network, where the bandwidth is not fully utilized and the link BER is $10^{-8}$. The four protocols achieve a higher. PSNR value and the corresponding MOS value is 5, while the reliable protocol has higher video transmission quality than the unreliability protocol. The PSNR of the APRT protocol is 11.62% higher than that of the p4 strategy. The lower part of Table 2 shows a poor network status, where the bandwidth low and link BER of $10^{-5}$. Therein, PSNR of p2 strategy is 0, indicating that the video cannot be decoded and reconstruction. The video quality based on p3 strategy and p4 strategy is fair and poor, respectively. The APRT protocol with a certain reliability guarantee can reach 32.89, which ensures a better video transmission quality.

TABLE 2

Video Quality of Different Protocols under Single Flow
Scenarios with Different Bandwidths and BERs.

| Bandwidth protocol | BER | PSNR | MOS | MOS evaluation |
|---|---|---|---|---|
| 10 Mb/s | | | | |
| P1 | $10^{-8}$ | 41.525381 | 5 | Excellent |
| P2 |  | 41.623857 | 5 | Excellent |
| P3 |  | 37.296478 | 5 | Excellent |
| P4 |  | 37.202516 | 5 | Excellent |
| 200 Kb/s | | | | |
| P1 | $10^{-5}$ | 32.889131 | 4 | Good |
| P2 |  | 0 | 1 | Bad |
| P3 |  | 29.525154 | 3 | Fair |
| P4 |  | 24.092692 | 2 | Poor |

Figure 13:
Figure 14:
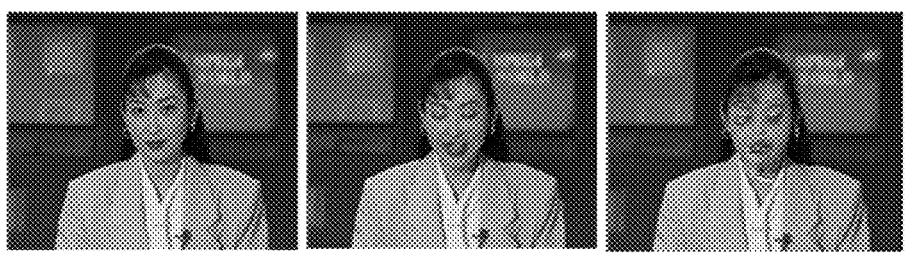
Figure 15:
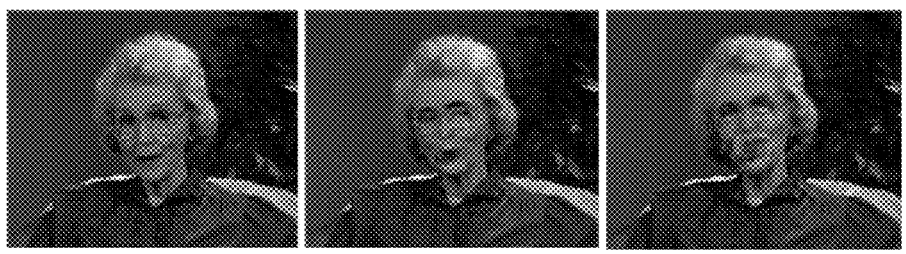

FIG. 9-12 and FIG. 13-15 show the video quality comparison of different video test sequences in different network states. By comparing with the source video image, it can be seen that the video quality of the APRT protocol and p2 strategy of the second and third columns is almost as clear as the source video image, and the video quality of p4 strategy is slightly worse, especially for dynamic image. In FIG. 13-15, due to this network state, p2 strategy is unable to carry out video decoding and reconstruction work, so we only show the quality of two compared video transfer protocols, i.e., p3 and p4. It can be seen that the quality of APRT protocol video is significantly better than that of p4 protocol.

Figure 16:
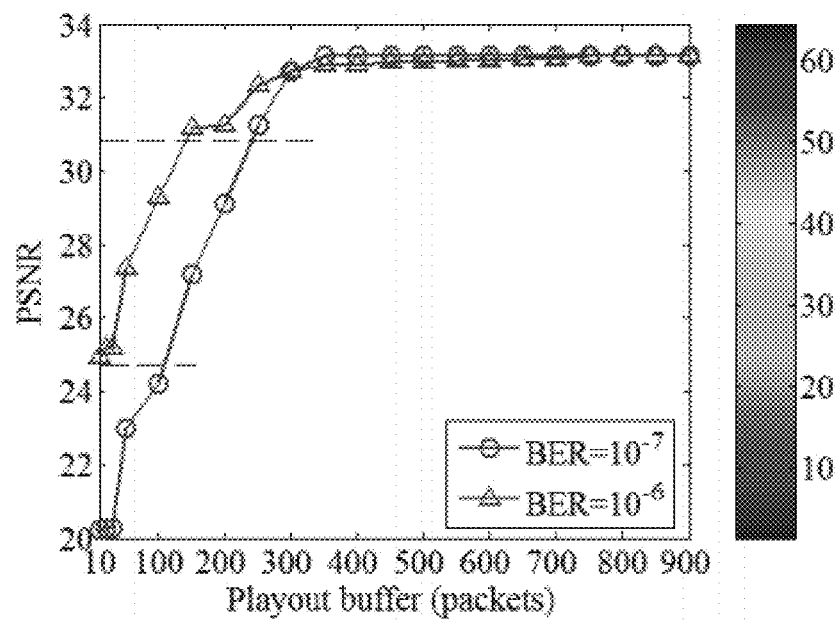

FIG. 16 shows that the bigger the playout buffer is, the better the video quality are. When the link error rate is $10^{-7}$ and the playout buffer size is less than 150, video quality only achieve fair quality. When the playout buffer size is higher than 150, the video quality is good. When the link error rate of $10^{-5}$ and the playout buffer size is less than 110, the video quality is poor, while the playout buffer size is higher than 240, the video quality is good. After the playout buffer size is higher than 350, continue to increase the size of the playout buffer does not improve the quality of the video any more. Overall, we can see that for a playout buffer with 150 to 300 packets, APRT can achieve a good quality of video playback. Moreover, because the poor satellite networks environment, larger playout buffer size is not necessary.

Figure 17:
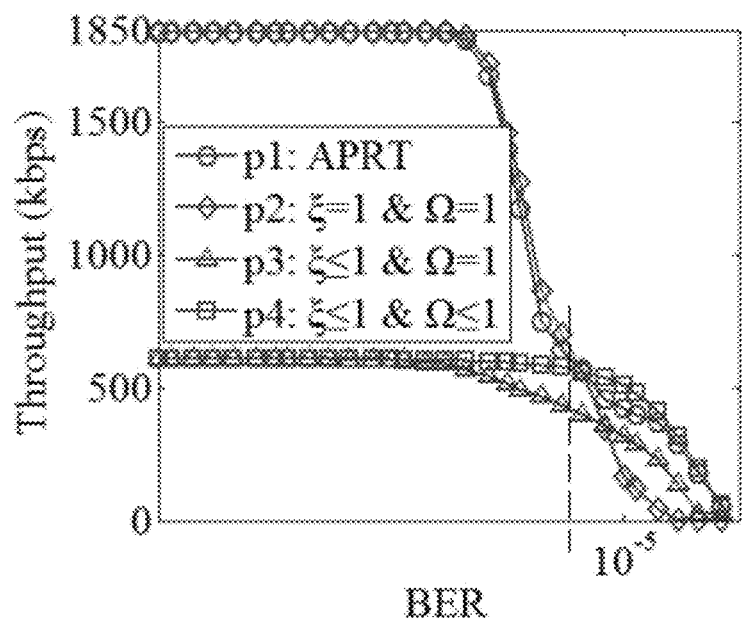
Figure 18:
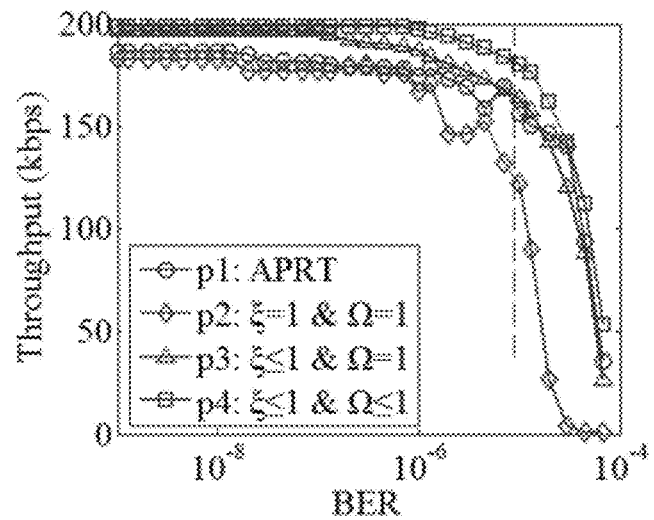

It can be seen from FIGS. 17 and 18 that the results are almost the same as the single flow experiments, that is, the average throughput of all protocols decrease as the link BER increases. As shown in FIG. 17, the bottleneck link bandwidth is 10 Mbps and the link error rate is $4.5 \times 10^{-6}$, average throughput of APRT, p2 and p4 strategy are around 560 Kbps. The results of FIG. 18 differ from the single flow scenario, the average throughput of APRT protocol holds between the performance of p2 and p4 strategy. When the BER is $10^{-5}$, the average throughput of APRT protocol is higher than that of p2 strategy.

Figure 19:
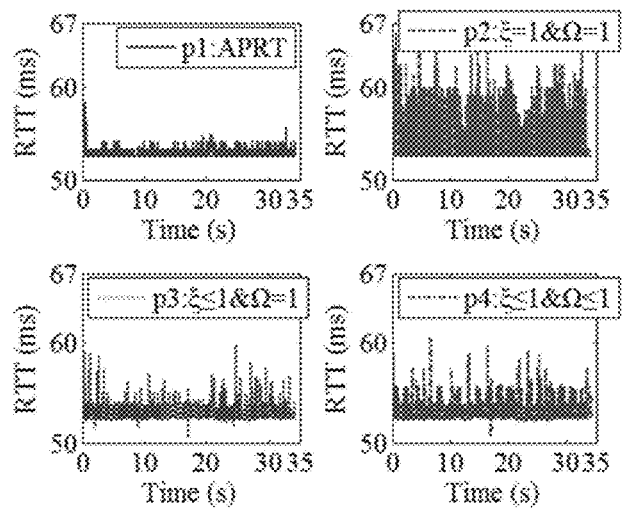
Figure 21:
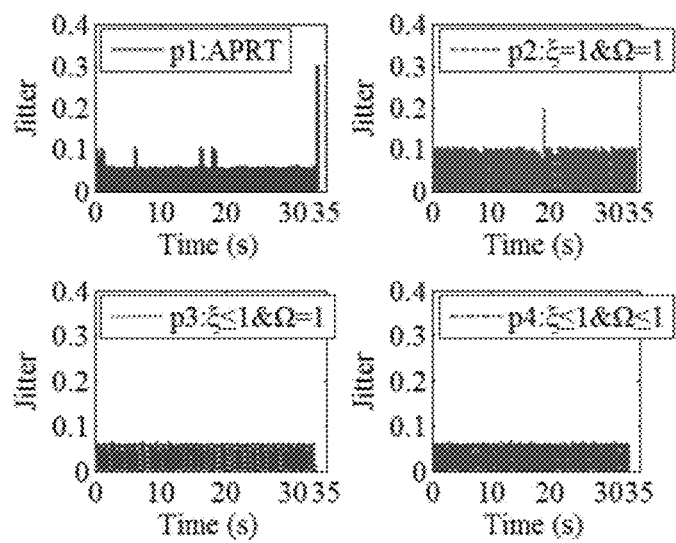

The evaluation of round trip delay and delay jitter is also similar to the result of a single flow scenario. FIG. 19 shows the delay curve changing over time when the link BER is $10^{-5}$ in scenario A. It can be seen from the figure that RTT of APRT protocol packet changes in the interval of [52.5 ms, 55 ms]. When p2 becomes stable, its RTT changes in the interval of [52 ms, 65 ms]. The RTT of p3 strategy and p4 strategy are between the interval of [52.5 ms, 60 ms]. The corresponding delay jitter results are given in FIG. 21, which shows that the APRT protocol has a larger round trip delay and can maintain a smaller queuing delay in the router.

Figure 20:
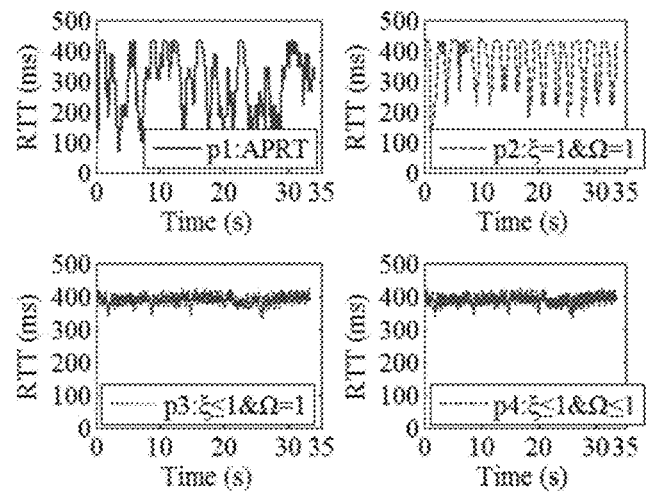
Figure 22:
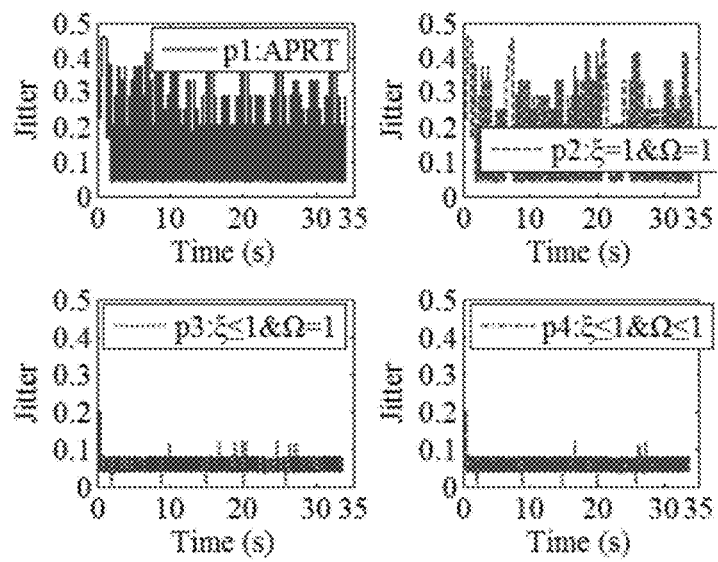

FIG. 20 shows the RTT curve varying over time when link BER is $10^{-5}$ in scenario B. It can be seen from the figure that when the network data flow increases, the round trip delay increases from 150 ms to 400 ms comparing with when there is only a single flow in the network. The overall round trip delay of APRT protocol is the smallest. However, as shown in FIG. 22, APRT has a large delay jitter like p2.

Table 3 is used to check the coexistence of multiple data strip in different network state under different packet loss situation. It can be seen that in the case of multiple flow coexisting situations, all of the protocols have a high packet loss rate, especially when the bandwidth is 200 Kbps. The packet loss rate of APRT reduced by 77.69% and 55.05% comparing with the p4 strategy.

TABLE 3

Lost Frames of Different Protocols under Concurrent Flow
Scenarios with Different Bandwidths and BERs.

| Bandwidth Protocol | BER | Packet loss rate | Lost frame |
|---|---|---|---|
| 10 Mb/s | | | |
| P1 | $10^{-7}$ | 0.0173 | 48 |
|  | $10^{-5}$ | 0.1475 | 71 |
| P2 | $10^{-7}$ | 0.0158 | 41 |
|  | $10^{-5}$ | 0.2198 | 87 |
| P3 | $10^{-7}$ | 0.0672 | 54 |
|  | $10^{-5}$ | 0.1340 | 69 |
| P4 | $10^{-7}$ | 0.0677 | 55 |
|  | $10^{-5}$ | 0.1093 | 74 |

TABLE 3-continued

Lost Frames of Different Protocols under Concurrent Flow Scenarios with Different Bandwidths and BERs.

| Bandwidth Protocol | BER | Packet loss rate | Lost frame |
|---|---|---|---|
| 200 Kb/s | | | |
| P1 | $10^{-7}$ | 0.1982 | 54 |
|  | $10^{-5}$ | 0.2981 | 64 |
| P2 | $10^{-7}$ | 0.2068 | 55 |
|  | $10^{-5}$ | 0.3301 | 69 |
| P3 | $10^{-7}$ | 0.8885 | 6814 |
|  | $10^{-5}$ | 0.8885 | 6791 |
| P4 | $10^{-7}$ | 0.8885 | 6814 |
|  | $10^{-5}$ | 0.8867 | 6800 |

For the upper part of Table 4, when the network state is better, the four protocols can reach a higher PSNR value, and the MOS value is 4. The PSNR of difference protocol is not significant. However, when the network gets worse, the performance of APRT protocol is significantly better than the other three protocols. It can be concluded that APRT ensures a better video transmission quality.

TABLE 4

Video Quality of Different Protocols under Concurrent Flow Scenarios with Different Bandwidths and BERs.

| Bandwidth Protocol | BER | PSNR | MOS | MOS evaluation |
|---|---|---|---|---|
| 10 Mb/s | | | | |
| P1 | $10^{-8}$ | 33.032264 | 4 | Good |
| P2 | | 33.146254 | 4 | Good |
| P3 | | 32.484776 | 4 | Good |
| P4 | | 32.440097 | 4 | Good |
| 200 Kb/s | | | | |
| P1 | $10^{-6}$ | 30.652149 | 3 | Fair |
| P2 | | 0 | 1 | Bad |
| P3 | | 27.088844 | 3 | Fair |
| P4 | | 22.441292 | 2 | Poor |

Figure 23:
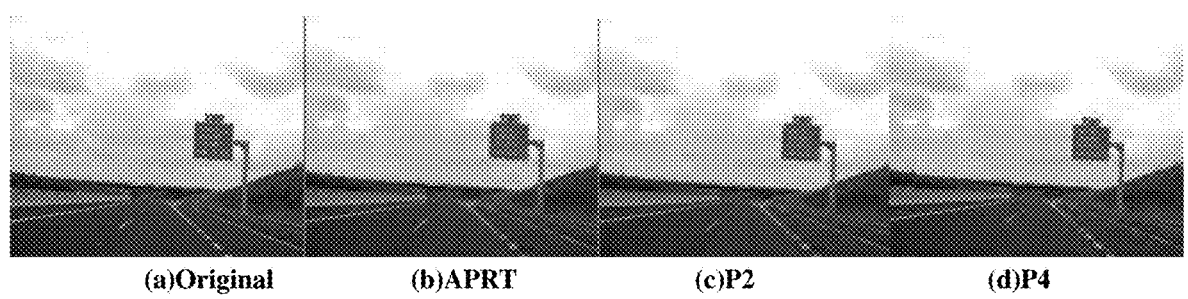
Figure 24:
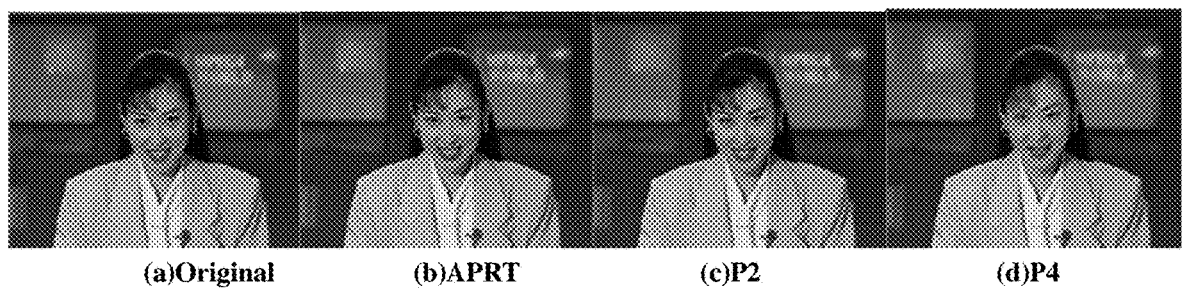
FIG. 24 shows subjective video quality of different concurrent protocols using different video test sequence, when the bandwidth is 10 Mb/s and BER is $10^{-7}$ (2).
Figure 25:
FIG. 25 shows subjective video quality of different concurrent protocols using different video test sequence, when the bandwidth is 200 Kb/s and BER is $10^{-6}$ (1).
Figure 26:
FIG. 26 shows subjective video quality of different concurrent protocols using different video test sequence, when the bandwidth is 200 Kb/s and BER is $10^{-6}$ (2).

It can be seen from FIGS. 23 and 24 that the video quality of the APRT protocol and the p2 strategy is almost as well as the source video image, while the video quality transmitted by the p4 strategy is slightly worse, especially for the dynamic images. For FIGS. 25 and 26, because in this network state, p2 strategy transmission of data has been unable to carry out video decoding and reconstruction work, so only shows the quality of other two comparing transmission protocol. It can be seen that video quality based on APRT protocol is significantly better than that of p4 strategy. Because the first sequence images are relatively static, so the quality is better than that of the second row. For second row, the transfer of p4 strategy represents a serious discontinuous phenomenon.

The invention claimed is:

1. A reliable transmission method based on a hidden Markov model (HMM model) to handle a quality and a real-time problem of a delay-sensitive video service over lossy satellite links, the method comprising:

Step 1: Presenting a specification definition of the HMM model, including
   using the HMM model to forecast a retransmission rate; using an underlying network packet loss rate as a hidden state of the HMM model; using the retransmission rate as an observation state; by analyzing historically transmitted data sessions, establishing a relationship between a hidden state transition probability and an emission probability, and obtaining a robust and efficient retransmission rate prediction, such that:
   a random variable $W_t$ is defined as the retransmission rate in a time period t;
   $w_t$ is defined as an actual retransmission rate measured in a network;
   $\hat{W}_t$ indicates a predicted value of the random variable $W_t$;
   a retransmission rate of a strategy $W_t$ is changing with a variation of hidden state variables $X_t \in \chi$, where $\chi \in \{x_1, x_2, \ldots, x_N\}$ represents a set of possible discrete state sequences and $N=|\chi|$ indicates a number of states;
   the hidden state variables $X_t$ are a random variable and a probability distribution is defined as a vector $\pi = (P(X_t=x_1), \ldots, P(X_t=x_N))$;
   a current state varies with a Markov process, where a probability distribution of the current state is determined by a state of a previous period, expressed as $P(X_t|X_{t-1}, \ldots, X_1) = P(X_t|X_{t-1})$;
   a defined transition probability matrix is $P = \{P_{ij}\}$, where $P_{ij} = P(X_t=x_i|X_{t-1}=x_j)$, and $\pi_{t+\tau} = \pi_t P^\tau$; and
   when a hidden state $X_t$ is given, a probability distribution function (pdf) of the network packet loss rate follows the Gaussian distribution function: $W_t|X_t=x \sim N(\mu_x, \sigma_x^2)$;

Step 2: Executing an offline training phase, including, when the number of states N is given and a training data set is Set $(M_s^*, s)$, utilizing a maximum likelihood estimation algorithm to calculate the parameters of the HMM model, which can be expressed by the equation $\theta_{HMM} = \{\pi_0, P, \{(\mu_x, \sigma_x^2), x \in \chi\}\}$;

Step 3: Executing an online prediction stage, including
   a prediction initialization including: providing a Set $(M_s^*, s)$ as a most matching feature for a transmission of flow s, which is defined as $\hat{W}_1 = \text{Median (Set}(M_s^*, s))$, where Set$(M_s^*, s)$ is a mean value of a data set and an initial network packet loss rate;
   a forecast phase including: in the time period t, providing an updated pdf of the HMM model, then according to a Markov feature, calculating the pdf of a current time period using the equation $\pi_{t|1:t-1} = \pi_{t-1|1:t-1} P$, and calculating the predicted retransmission rate $\hat{W}_t$; and
   a parameter update of the HMM model including: when the network packet loss rate $W_t = w_t$, and $\pi_{t|1:t-1}$ are provided, using a Baum-Welch algorithm to update the parameters of the HMM model, such that $\pi_{t|1:t-1}$ is updated as $\overline{\pi}_{t|1:t-1}$, and $P_{ij}$ is updated as $\overline{P}_{ij}$;

Step 4: Executing Congestion Control, including
   a rate control for a video flow including:
      when a receiver uses the HMM model to determine a retransmission rate of a video, the receiver returning adaptive ACK feedback packets; and
      when a sender receives the adaptive ACK feedback packets, an APRT protocol congestion window control adopting loss based congestion indicators, and a cubic window growth function, which is defined in Cubic TCP, so as to update a congestion window increase;
   a fast retransmission including:
      when the network is in a non-congested state, the receiver returning almost all of the adaptive ACK feedback packets of all received data, and the sender performing fast retransmission after receiving duplicated adaptive ACK feedback packets or a timeout as a traditional transport protocol;

when the network is predicted to be in a poor or a congested state, the receiver retransmitting the adaptive ACK feedback packets partially, and the sender only performing fast retransmission for confirmed lost packets; and when the network is predicted to be in extreme conditions, including when the network is in an idle time, regarding an APRT protocol as a completely reliable transmission protocol as a TCP protocol.

2. The method of claim 1, wherein the formula to calculate $\hat{W}_t$ in Step 3 is defined as follows:

$$\hat{W}_t = \mu_x$$

$$x = \arg\max_{x \in \chi} P\left(\sum_j^n X_N(j)\right)$$

-continued $$X_{t+1}(j) = \sum_{i=1,\ldots,N} X_t(i) P_{ij} \cdot W_{t+1} \mid X_j.$$

3. The method of claim 1, wherein the formulas to calculate $\overline{\pi}_{t|1:t-1}$ and $\overline{P}_{ij}$ in Step 3 are defined as follows:

$$\overline{\pi}_{t|1:t-1} = \frac{P(W_1, W_2, \ldots, W_t, X_t = x_i \mid W_{1:t}) \cdot P(W_{t+1} \mid X_t = x_i, W_{1:t})}{\sum_{i=1}^{N} P(W_1, W_2, \ldots, W_t, X_t = x_i \mid W_{1:t}) \cdot P(W_{t+1} \mid X_t = x_i, W_{1:t})}$$

$$\overline{P}_{ij} = \frac{P(W_1, W_2, \ldots, W_t, X_t = x_i \mid W_{1:t}) P_{ij} \cdot W_{t+1} \mid X_j \cdot P(W_{t+1}, W_{t+2} \mid X_{t+1} = x_{i+1}, W_{1:t+1})}{\sum_{i=1}^{N} P(W_1, W_2, \ldots, W_t, X_t = x_i \mid W_{1:t}) \cdot P(W_{t+1} \mid X_t = x_i, W_{1:t})}.$$

* * * * *